United States Patent
Chen et al.

(10) Patent No.: US 12,079,004 B2
(45) Date of Patent: *Sep. 3, 2024

(54) VERIFICATION OF ITERATIVE CLOSEST POINT ALIGNMENTS FOR AUTONOMOUS VEHICLES

(71) Applicant: Waymo LLC, Mountain View, CA (US)

(72) Inventors: Mingcheng Chen, Sunnyvale, CA (US); Christian Lauterbach, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/405,715

(22) Filed: Aug. 18, 2021

(65) Prior Publication Data

US 2022/0004197 A1   Jan. 6, 2022

Related U.S. Application Data

(63) Continuation of application No. 16/194,837, filed on Nov. 19, 2018, now Pat. No. 11,126,197.

(51) Int. Cl.
| | | |
|---|---|---|
| *G05D 1/00* | (2006.01) | |
| *G01S 13/86* | (2006.01) | |
| *G01S 17/89* | (2020.01) | |

(52) U.S. Cl.
CPC .......... *G05D 1/0248* (2013.01); *G01S 13/865* (2013.01); *G01S 17/89* (2013.01); *G05D 1/0088* (2013.01); *G05D 1/0221* (2013.01)

(58) Field of Classification Search
CPC .. G05D 1/0248; G05D 1/0088; G05D 1/0221; G05D 2201/0213; G01S 13/865;

(Continued)

(56) References Cited

U.S. PATENT DOCUMENTS 9,945,950 B2  4/2018  Newman et al.
10,579,063 B2  3/2020  Haynes et al.
(Continued)

FOREIGN PATENT DOCUMENTS

CN   104764457 A   7/2015

OTHER PUBLICATIONS

Censi, Andrea, "An Accurate Closed-Form Estimate of ICP's Covariance", 2007 IEEE International Conference on Robotics and Automation, Roma, Italy, Apr. 10-14, 2007, 6 pages.
(Continued)

*Primary Examiner* — Abdalla A Khaled
(74) *Attorney, Agent, or Firm* — Botos Churchill IP Law

(57) ABSTRACT

Aspects of the disclosure relate to training and using a model for verifying accuracy of ICP alignments or alignments between data points using an iterative closest point algorithm. For instance, a model may be trained using ICP alignment data, including alignments between an object appearing in LIDAR sensor frames. The training may also include setting a definition for a trusted ICP alignment. In this regard, the model may be trained such that, n response to receiving additional LIDAR sensor frames and corresponding additional ICP alignment data, output a value indicative of whether the additional ICP alignment data is trusted according to the definition. The model may then be used to control a vehicle in an autonomous driving mode by determining whether alignment data for object determined using the ICP algorithm should be trusted.

20 Claims, 11 Drawing Sheets

(58) Field of Classification Search
CPC ........ G01S 17/89; G01S 7/417; G01S 13/726; G01S 2013/93273; G01S 13/58; G01S 13/867; G01S 13/931; G01S 17/931
See application file for complete search history.

(56) References Cited

U.S. PATENT DOCUMENTS

| | | | |
|---|---|---|---|
| 2016/0209211 A1* | 7/2016 | Song | G01S 7/4972 |
| 2018/0188026 A1 | 7/2018 | Zhang et al. | |
| 2018/0188039 A1 | 7/2018 | Chen et al. | |
| 2018/0216944 A1* | 8/2018 | Mielenz | G05D 1/0088 |
| 2018/0341007 A1* | 11/2018 | Fetterman | G01S 13/931 |
| 2018/0374359 A1 | 12/2018 | Li et al. | |
| 2019/0044949 A1* | 2/2019 | Bartfai-Walcott | H04W 12/63 |
| 2019/0120946 A1* | 4/2019 | Wheeler | H04N 13/106 |
| 2019/0196481 A1 | 6/2019 | Tay et al. | |
| 2019/0258249 A1* | 8/2019 | Kim | G05D 1/0061 |
| 2019/0258251 A1* | 8/2019 | Ditty | B60W 50/023 |
| 2019/0272389 A1* | 9/2019 | Viente | G06V 20/582 |
| 2020/0004259 A1 | 1/2020 | Gulino et al. | |
| 2020/0033444 A1* | 1/2020 | Marsch | G01S 13/931 |
| 2020/0073399 A1* | 3/2020 | Tateno | G05D 1/0274 |
| 2020/0150665 A1* | 5/2020 | Refaat | B60W 60/0015 |
| 2020/0386881 A1* | 12/2020 | Buddendick | G01S 13/931 |
| 2022/0172487 A1* | 6/2022 | Ewert | G01S 7/4026 |
| 2022/0329715 A1* | 10/2022 | Wheeler | G01S 7/497 |
| 2022/0342066 A1* | 10/2022 | Burger | G01S 13/58 |
| 2022/0355818 A1* | 11/2022 | Janssen | G06V 20/58 |

OTHER PUBLICATIONS

Merriaux, et al., "LiDAR point clouds correction acquired from a moving car based on CAN-bus data", arXiv:1706.05886v1 [cs.RO], Jun. 19, 2017, 7 pages.

Wei, et al., "LiDAR and Camera Detection Fusion in a Real-Time Industrial Multi-Sensor Collision Avoidance System", arXiv:1807.10573v1 [cs.CV], Jul. 11, 2018, 34 pages.

* cited by examiner

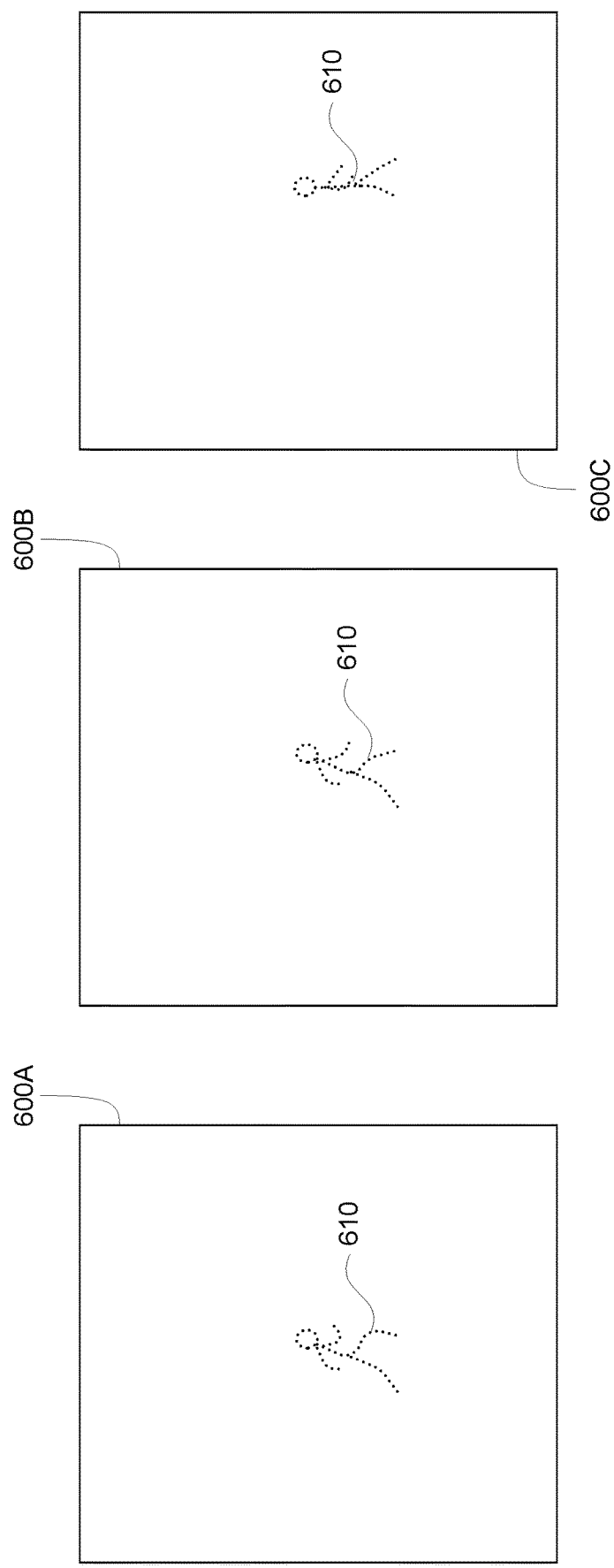

VERIFICATION OF ITERATIVE CLOSEST POINT ALIGNMENTS FOR AUTONOMOUS VEHICLES

CROSS REFERENCE TO RELATED APPLICATIONS

The present application is a continuation of U.S. patent application Ser. No. 16/194,837, filed Nov. 19, 2018, the entire disclosure of which is incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, etc.

This information is critical to allowing the vehicle's computing systems to make appropriate driving decisions for the vehicle and may be determined from correspondences between portions of sensor data. As one instance, correspondences between LIDAR data points of LIDAR scan data may be determined using an iterative closest point (ICP) algorithm. The ICP algorithm may be used to determine correspondences between LIDAR sensor point clouds for the same object. For a perception system of an autonomous vehicle, the ICP algorithm may be run on every pair of consecutive point clouds of the same object. This may include, for example, vehicles, pedestrians, and cyclists, and the ICP algorithm may provide each object's movement, i.e. translation and rotation, from consecutive observations of the object. The translation divided by the time difference between the point clouds may provide a velocity, and the rotation divided by the time gap can provide yaw rate, pitch rate and roll rate. These values are helpful for object tracking, behavior predicting, and trajectory planning for the autonomous vehicle.

BRIEF SUMMARY

Aspects of the disclosure provide a method for controlling a vehicle having an autonomous driving mode. The method includes receiving, by one or more computing devices of the vehicle, a plurality of LIDAR sensor data frames including an object, the plurality of LIDAR sensor frames being generated by a LIDAR sensor; using, by the one or more computing devices, the plurality of LIDAR sensor data frames and an ICP algorithm to determine alignment data for the object; determining, by the one or more computing devices, whether the alignment data for the object should be trusted using a model; and controlling, by the one or more computing devices, the vehicle in the autonomous driving mode based on the determination of whether the alignment data for the object should be trusted.

In one example, the model is a decision tree. In another example, the model is configured to output a boolean value indicating whether the alignment data for the object should be trusted. In another example, the model is configured to output a value indicative of how close the alignment data is to a human operator labeled LIDAR sensor data. In another example, the model is configured to determine whether the alignment data is within a tolerance of expected ground truth data. In this example, the alignment data includes covariance, and the model is configured such that the tolerance increases with the covariance. In this example, the tolerance is a fixed value. In another example, controlling the vehicle based on the determination of whether the alignment data for the object should be trusted includes disregarding the alignment data. In this example, the method also includes, based on the determination of whether the alignment data for the object should be trusted, using sensor data from a second sensor different from the LIDAR sensor to determine a velocity of the object, and controlling the vehicle is further based on the determined velocity. In this example, the second sensor is a radar unit. In another example, the method also includes, based on the determination of whether the alignment data for the object should be trusted, increasing uncertainty for the alignment data, and wherein controlling the vehicle is further based on the increased uncertainty. In this example, controlling the vehicle includes using the increased uncertainty to predict a future trajectory for the object. In addition or alternatively, controlling the vehicle includes using the increased uncertainty to plan a future trajectory for the vehicle. In another example, the method also includes, based on the determination whether the alignment data for the object should be trusted, flagging the alignment data as inaccurate, and wherein controlling the vehicle is further based on the flag. In this example, controlling the vehicle includes using the flagged alignment data to predict a future trajectory for the object. In addition or alternatively, controlling the vehicle includes using the flagged alignment data to plan a future trajectory for the vehicle.

Another aspect of the disclosure provides a method of training a model for validating alignments from iterative closest point (ICP) algorithm. The method includes receiving, by one or more server computing devices, a set of LIDAR sensor data frames, each LIDAR sensor frame including an object as well as a label for the object, wherein each LIDAR sensor frame of the set of LIDAR sensor frames is associated with a timestamp and is sequenced with respect to other LIDAR sensor frames of the set of LIDAR sensor frames; receiving, by the one or more server computing devices, ICP alignment data for the object generated using an ICP algorithm and the set of LIDAR sensor frames; setting, by the one or more server computing devices, a definition of a trusted ICP alignment for the model; and training, by the one or more server computing devices, the model using LIDAR sensor data frames such that the model is configured to, in response to receiving additional LIDAR sensor frames and corresponding additional ICP alignment data, output a value indicative of whether the additional ICP alignment data is trusted according to the definition.

In one example, the ICP alignment data includes a number of point correspondences, a number of iterations, and a covariance of an ICP alignment for the set of LIDAR sensor frames. In another example, the definition includes whether a velocity determined from the ICP alignment data is within a tolerance value of a velocity determined from the labels. In another example, the model is a decision tree.

BRIEF DESCRIPTION OF THE DRAWINGS

FIGS. 6A, 6B, and 6C are example representations of LIDAR sensor frames in accordance with aspects of the disclosure.

DETAILED DESCRIPTION

Overview

Figure 1:
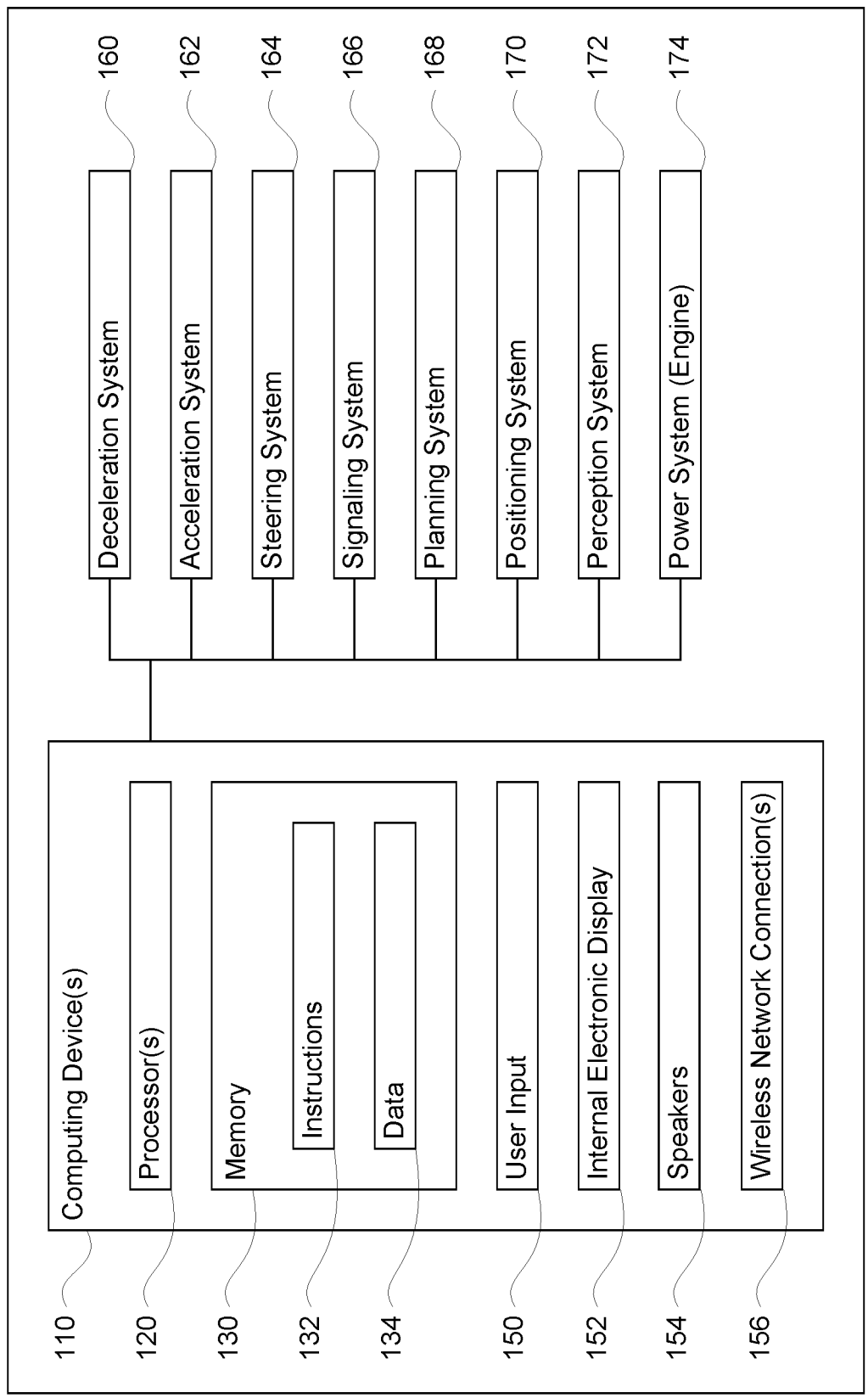
FIG. 1 is a functional diagram of an example vehicle in accordance with an exemplary embodiment.

The technology relates to verifying accuracy of iterative closest point (ICP) algorithm alignments between point clouds. For instance, as noted above, the ICP algorithm may be used to determine correspondences between LIDAR sensor point clouds for the same object. For a perception system of an autonomous vehicle, the ICP algorithm may be run on every pair of consecutive point clouds of the same object. This may include, for example, vehicles, pedestrians, and cyclists, and the ICP algorithm may provide each object's movement, i.e. translation and rotation, from consecutive observations of the object. The translation divided by the time difference between the point clouds may provide a velocity, and the rotation divided by the time gap can provide yaw rate, pitch rate and roll rate.

Therefore, good alignment values are helpful for object tracking, behavior predicting, and trajectory planning for the autonomous vehicle. An incorrect alignment or even several consistently incorrect alignments can impact the ability of the vehicle's computing devices to track an object. To address this, a machine learned detector or model may be used to verify the accuracy of the alignments and specifically to identify "bad" ones.

In order to generate the model, training data including ground truth information about the speed and location of objects may be generated. The training data may include features and variables involved in the ICP process as well as the "raw" or unprocessed LIDAR sensor data points. In addition, the LIDAR sensor data may be analyzed and labeled by human operators. For example, a human operator may provide labels and bounding boxes for LIDAR data points for an entire frame or scene (rather than a single object) captured by a perception system of a vehicle. Each frame may be time sequenced such that the frames progress through time. In that regard, a first frame may correspond to a time immediately before a second frame that may correspond to a time immediately before a third frame.

Once the human operator has confirmed label bounding boxes for an object in a series of timestamped frames, these bounding boxes may be used to derive information about the object. For instance, the velocities, acceleration/decelerations, headings, trajectories, etc. across the series of time-stamped frames may be determined. This information, as well as the bounding boxes and frames may be used as training data for the model.

The model may first be trained "offline" that is, ahead of time and/or at a remote computing device and thereafter sent to an autonomous vehicle for use. The model may be trained such that for any given series of two or more LIDAR sensor frames, the model determine how close an ICP alignment would be to a human operator labeled LIDAR sensor data or in other words, whether the ICP alignment should be trusted (good alignment) or should not be trusted (bad alignment).

As noted above, once trained, the model may then be provided to one or more vehicles in order to allow the computing devices of those vehicles to verify the accuracy of the ICP algorithm alignments. For instance, the computing devices of a vehicle may receive a plurality of LIDAR sensor data frames including an object. This plurality of LIDAR sensor frames may be generated by a LIDAR sensor of the vehicle. The LIDAR sensor data frames and the ICP algorithm may be used to determine alignment data for the object. The model may then be used to determine whether the alignment data for the object should be trusted. The vehicle may then be controlled in an autonomous driving mode based on the determination of whether the alignment data for the object should be trusted.

If the alignment data is considered trusted, the vehicle's computing devices may continue to use the ICP alignment data to control the vehicle, for instance by determining velocity and other data for the object, inputting this data into behavior models, determining trajectories for responding to the object, etc. For any alignments considered untrusted, the vehicle's computing devices may take any number of different actions with respect to the vehicle. For instance, the vehicle's computing devices may simply ignore the data for the object from the ICP algorithm and/or take any number of other actions.

The features described herein may allow an autonomous vehicle's computing devices to determine in real time when ICP algorithm alignments between point clouds are not accurate enough to be relied upon to make driving decisions for the autonomous vehicle. In other words, while the ICP algorithm is considered very precise, in some instances, the ICP algorithm can be inaccurate and essentially fail to properly align point clouds. The aforementioned model may thus allow for the determination of when the ICP algorithm has failed which allows an autonomous vehicle's computing devices to react accordingly.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planner system 168 may be used by computing device 110 in order to determine and follow a route to a location. In this regard, the planner system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2:
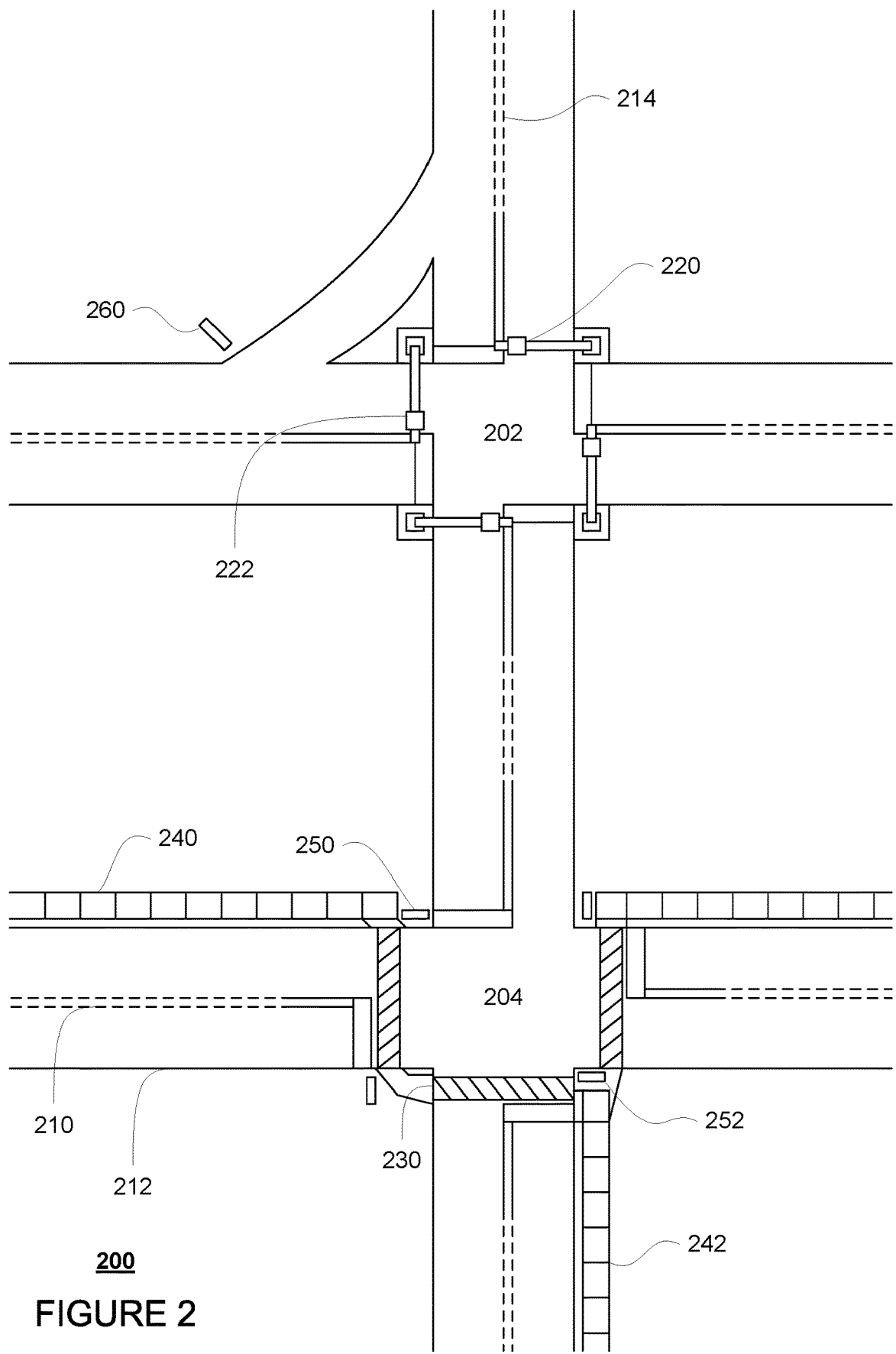
FIG. 2 is an example of map information in accordance with aspects of the disclosure.

FIG. 2A is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, 242, stop signs 250, 252, and yield sign 260. In this regard, the map information includes the three-dimensional (3D) locations of traffic lights 220, 222.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
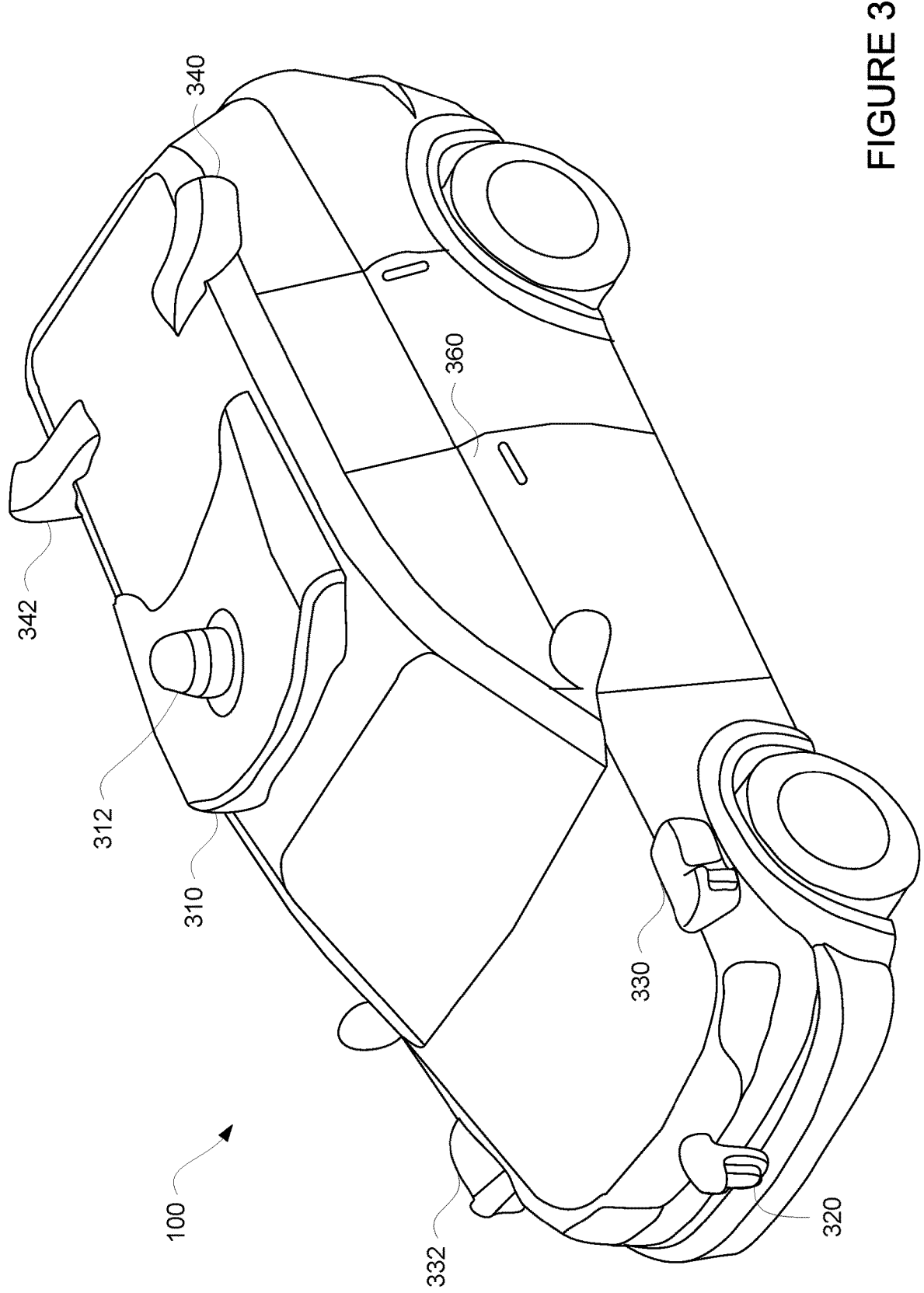
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing device 110 may control the vehicle by controlling various components. For instance, by way of example, computing device 110 may navigate the vehicle to a destination location completely autonomously using data from the detailed map information and planner system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
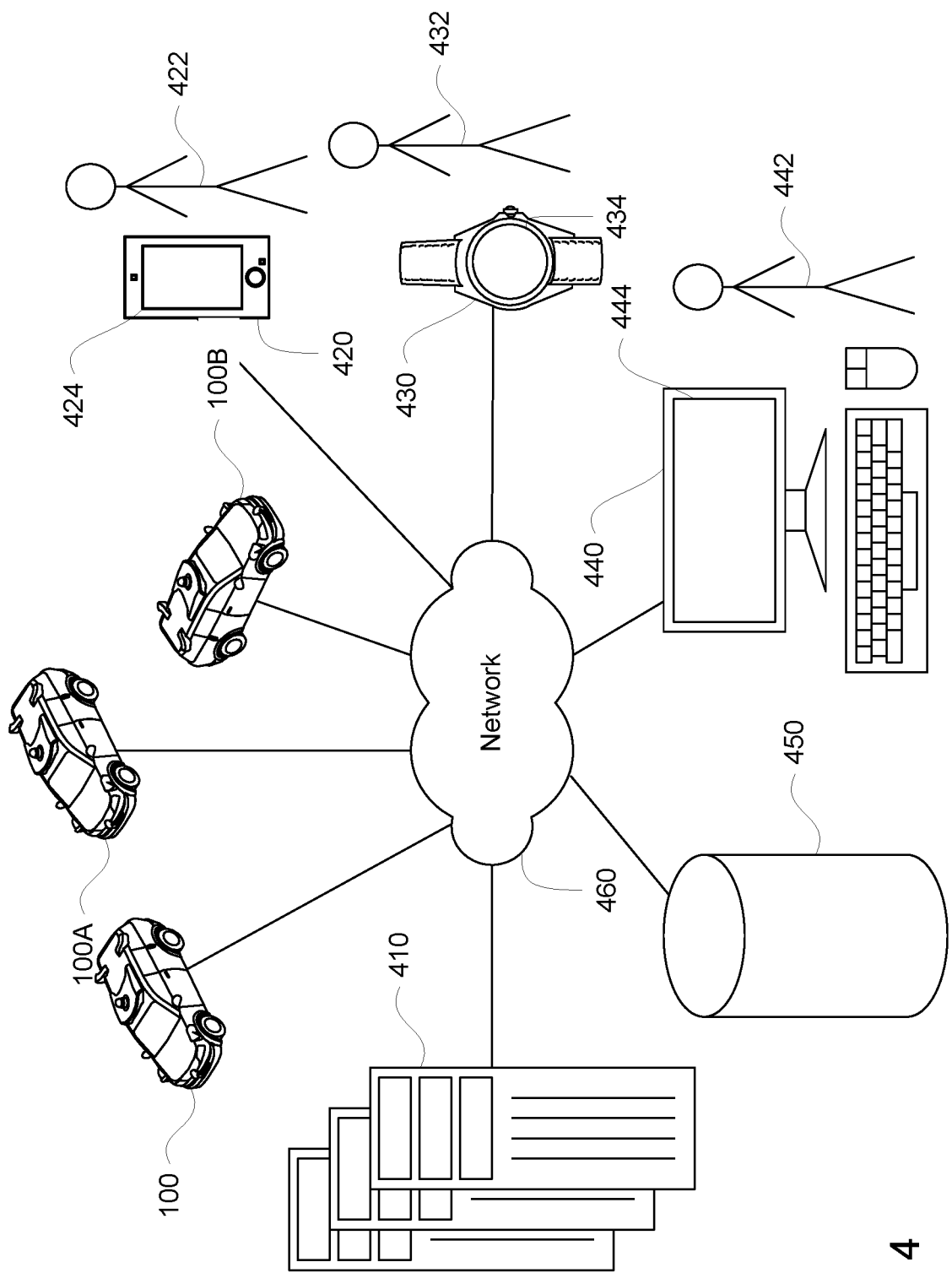
FIG. 4 is a pictorial diagram of an example system in accordance with aspects of the disclosure.
Figure 5:
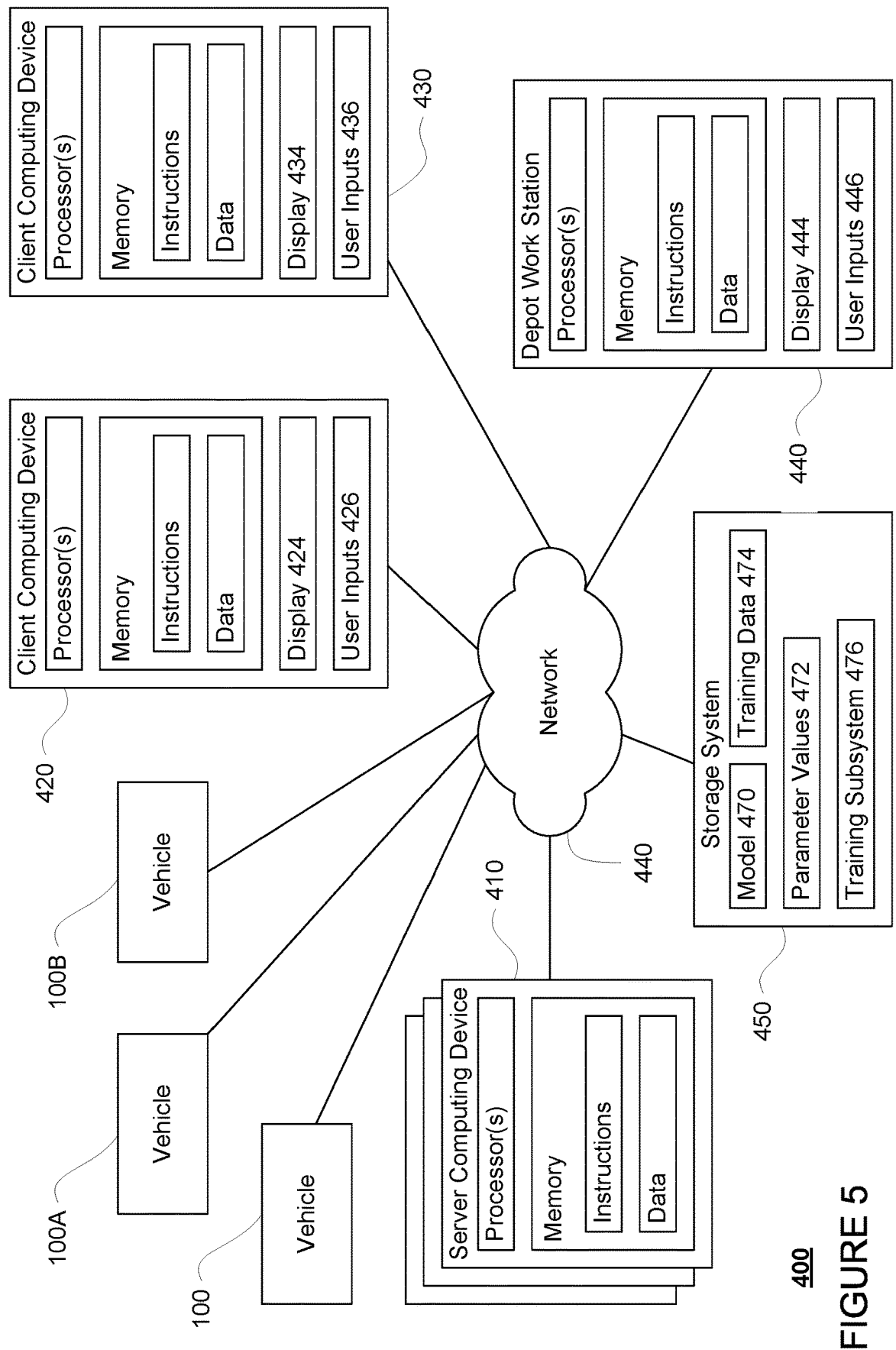
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. This information may be retrieved or otherwise accessed by a server computing device, such as one or more server computing devices 410, in order to perform some or all of the features described herein.

For instance, the storage system 450 may store sensor data 476 captured by a vehicle's perception system, such as perception system 172 of vehicle 100. The sensor data may include sensor data generated by one or more LIDAR sensors of a vehicle, such as a LIDAR sensor of dome housing 312 of vehicle 100. In this regard, the sensor data 476 may include LIDAR data points corresponding to the locations and intensity (or reflectivity) of surfaces off of which light generated by the LIDAR sensor is reflected back to LIDAR sensor.

This sensor data 476 may also include a plurality of images. This plurality of images may include images captured by a perception system of an autonomous vehicle in order to provide the most relevant context and orientation of signs that may appear in those images. For instance, the plurality of images may be images or frames captured by still and/or video cameras mounted on one or more vehicles such as vehicles 100 or 100A and uploaded via network 460 or otherwise sent to the storage system 450 for storage. Thus, the images may accurately reflect perception of the road and various objects from the perspective of the cameras or perception system of the vehicle. At least some of these images may be associated with labels and other information as discussed further below.

Each image may be associated with location information identifying the location and orientation from which the image was captured and/more detailed information, such as geographic information for various surfaces within the image as determined from comparing with other images and/or from LIDAR sensor data captured by a LIDAR sensor of the perception system 172 contemporaneously with the image. For instance, as noted above, the LIDAR sensor data may include data points corresponding to the locations and intensity (or reflectivity) of surfaces off of which light generated by the LIDAR sensor is reflected back to LIDAR sensor. This information may be used to determine the correspondences of those surfaces in the camera images.

The storage system 450 may store one or more models 470 as well as model parameter values 472 for each such model. For instance, the storage system may store one or more models for verifying the accuracy of ICP alignments. In addition, the storage system 450 may include a training subsystem 476 and training data 478 that can be used to train the model as discussed further below.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to be able to use a model of the one or more models 470 to verify the accuracy of ICP alignments, the model may first be trained "offline" that is, ahead of time and/or at a remote computing device and thereafter sent to the vehicle 100 via network 460 and wireless network connections 156. For instance, one or more of server computing devices 410 may generate the model parameter values 474 by first retrieving training data from the storage system 450.

In order to train the model, training data including ground truth information about the speed and location of objects may be generated. This information may be generated from LIDAR data points for the objects within an entire LIDAR sensor frame or scene captured by a perception system of a vehicle. A LIDAR sensor frame may correspond to data generated from 1 or more 360 degree scans or rotations of a LIDAR sensor. This LIDAR sensor data may include data points corresponding to the locations and intensity (or reflectivity) of surfaces off of which light generated by the LIDAR sensor is reflected back to the LIDAR sensor.

In order to generate the labels, a human operator may be shown a series of timestamped LIDAR sensor frames, for instance 3 or more or less, and may draw bounding boxes and include labels for different types of objects. For instance, user 442 may use client computing device 440 to review the LIDAR sensor frames and draw bounding boxes for objects. These objects may be all types of objects, or may only road users, such as pedestrians, vehicles, bicyclists, etc., in those frames. Each frame may be time sequenced such that the frames progress through time. In that regard, a first frame may correspond to a time immediately before a second frame that may correspond to a time immediately before a third frame. FIGS. 6A, 6B and 6C represent three consecutive "LIDAR sensor frames" or frames 600A, 600B, and 600C, respectively. Each frame including a pedestrian 610 at different locations.

Figures 7A, 7B, 7C:
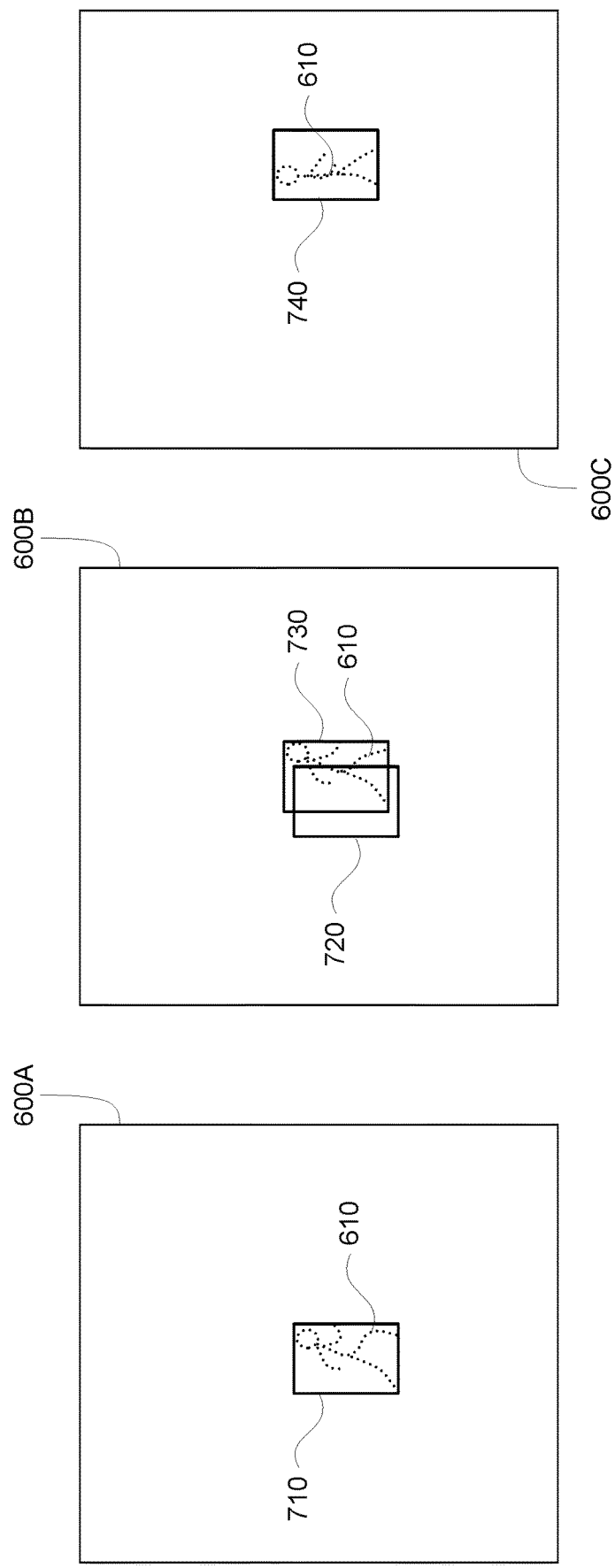
FIGS. 7A, 7B, and 7C are example representations of LIDAR sensor frames and bounding boxes in accordance with aspects of the disclosure.

The human operator may provide a first bounding box for an object in the first frame. For instance, turning to FIG. 7A, the human operator may draw bounding box 710 around the pedestrian 610 in frame 600A. To assist the human operator, the first bounding box may be projected into the second frame. For instance, turning to FIG. 7B, bounding box 710 may be projected into frame 600B as bounding box 720. The human operator may then adjust the projected bounding box as needed. For instance, the human operator may adjust the bounding box 720 to the position of bounding box 730.

To further assist the human operator, once there are at least two corresponding bounding boxes for an object in consecutive frames, the change in location between the first and second frames may be used to extrapolate a velocity for the object and project a new bounding box into the third frame based on this extrapolation. For instance, turning to FIG. 7C, using the locations of bounding boxes 710 and 730, another bounding box 740 may be projected into frame 600C. Again, if necessary, the human operator may adjust the location of bounding box 740 as needed. This projecting based on velocity may be continued for any additional time sequenced frames (i.e. those that are captured at a time immediately after that of frame 600C, and so on).

In addition or alternatively, bounding boxes be generated from a combination of LIDAR sensor frames and camera images where the human operator ensures that the bounding box is correct in LIDAR sensor frames as well as in camera image or images. For instance, rather than simply looking at LIDAR sensor data, a corresponding camera image captured contemporaneously with the LIDAR sensor frame may be used as a reference. In this regard, the bounding box, once applied to the LIDAR sensor frame, may also be projected into and displayed in the camera image. In addition or alternatively, the bounding boxes may be applied by a human operator to camera images and then projected into the space of the LIDAR sensor frames. Of course in such cases, the bounding box may have to be adjusted in the LIDAR sensor frame in order to account for the change from 2D (in the camera image) to 3D in the LIDAR sensor frame.

Once the human operator has provided bounding boxes for an object in a series of timestamped frames, these bounding boxes may be used to extrapolate information about the object. For instance, the velocities, acceleration/ decelerations, headings, trajectories, etc. across the series of timestamped frames may be determined using the changes in the locations of the bounding boxes of the time sequenced LIDAR sensor frames over time. This information may be incorporated into labels for the bounding boxes, and stored, for instance in the storage system 450.

The training data may also include the output of the ICP algorithm as well as features and variables involved in the ICP algorithm's process. For example, the LIDAR sensor frames 600A, 600B, and 600C may be input into an ICP algorithm in order to determine correspondences or ICP alignment data between the LIDAR data points of the pedestrian 610 within each of these images. The ICP algorithm may provide a translation and rotation between each LIDAR sensor frame which can be used to determine characteristics of the object, such as velocities, acceleration/ decelerations, headings, trajectories, etc. The ICP algorithm may also provide covariance or a covariance matrix between the alignments of the LIDAR sensor frames. Alternatively, the covariance may be computed independently of the ICP algorithm and may be used as training data. In addition, other features and variables of the ICP algorithm may also be used as training data, including, for instance, the number of iterations, number of point correspondences, correspondence-wise errors, and averages, etc. as well as information such as the appearance of the two point clouds aligned by the ICP transform (for instance their overlapping volumes), whether the object was occluded by another object, etc. Again, this ICP alignment data including the output of the ICP algorithm and the features and variables involved in the ICP algorithm's process may be stored, for instance, in the storage system 450.

Figure 8:
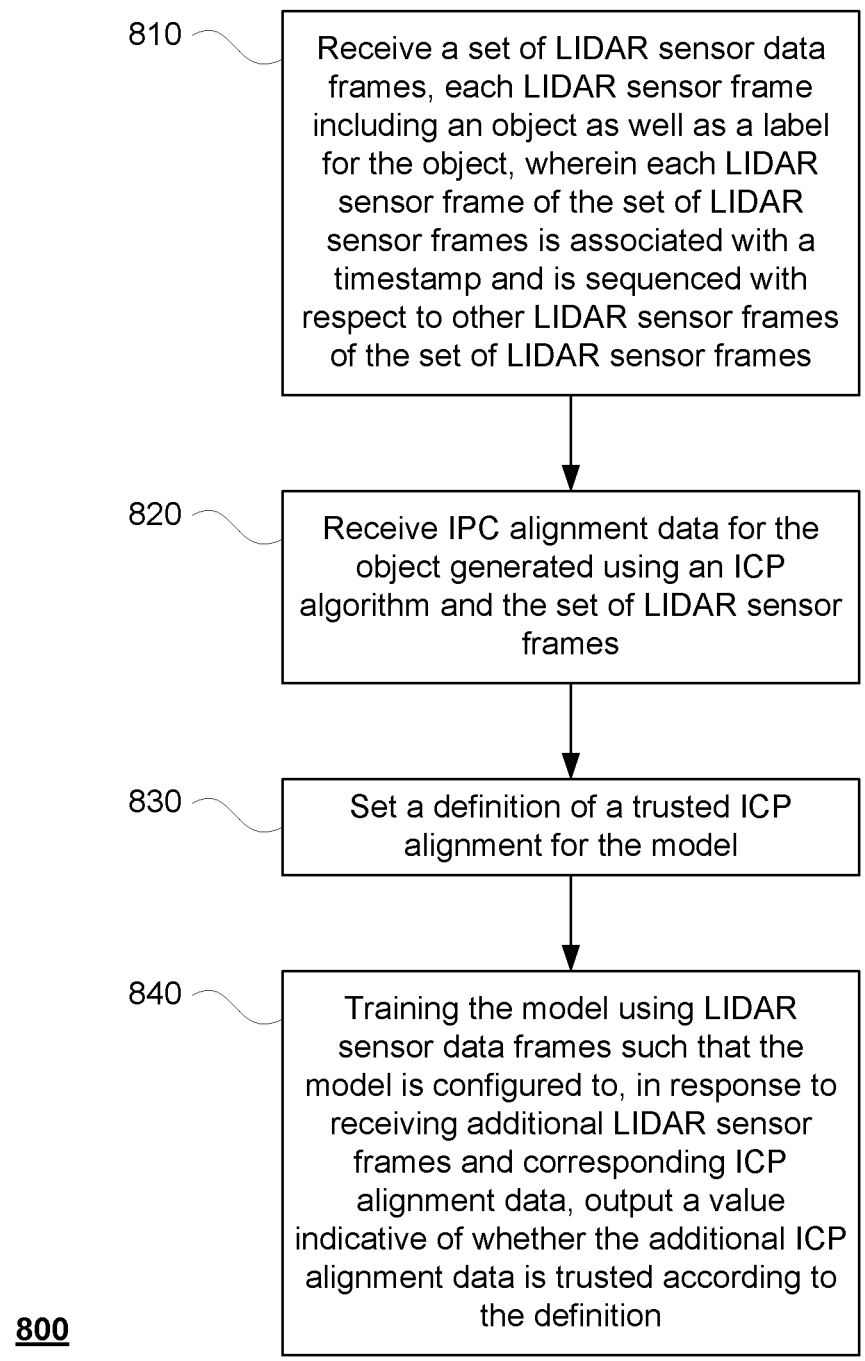
FIG. 8 is an example flow diagram in accordance with aspects of the disclosure.

FIG. 8 is an example flow diagram 800 in accordance with aspects of the disclosure which may be performed by one or more processors of one or more computing devices, such as processors of server computing devices 410, in order to train a model for validating alignments from an ICP algorithm. For instance, turning to block 810, a set of LIDAR sensor data frames may be received. Each LIDAR sensor frame includes an object as well as a label for the object, and each LIDAR sensor frame of the set of LIDAR sensor frames is associated with a timestamp and is sequenced with respect to other LIDAR sensor frames of the set of LIDAR sensor frames. At block 820, ICP alignment data is received for the object generated using an ICP algorithm and the set of LIDAR sensor frames. For instance, in order to train the model, the aforementioned training data may be retrieved by the server computing devices 410, for instance, from the storage system 450.

The model 470 may be a decision tree (such as a random forest decision tree), deep neural network, logistic regression, neural network, or any classification algorithm that provides a categorical output identifying whether an ICP alignment should be trusted or not given a list of input features. As noted above the list of input features may include, the aforementioned human-labeled bounding boxes, labels generated from the human-labeled bounding boxes (velocities, acceleration/decelerations, headings, trajectories, etc. for an object), the LIDAR sensor frames and/or camera images, as well as the ICP alignment data including the output of the ICP algorithm as well as features and variables involved in the ICP algorithm's process may all be used as training inputs.

In this regard, the output of the model 470 may be a simple Boolean or binary value, such as. 0 or 1, yes or no, trusted or untrusted, etc. In some instances, what is a trusted alignment need not be a labeled input for the training, but may be defined by human operators and set by the server computing devices performing the training. In this regard, as shown in block 830 of FIG. 8, a definition of a trusted ICP alignment for the model is set. As one example, the ICP alignment data may be considered "trusted" if the velocity, translation rate, and/or rotation rate determined from an ICP alignment is within a preset or fixed tolerance value of the ground truth velocity, translation rate, and/or rotation rate (i.e. the velocity, translation rate, and/or rotation rate as determined from human operator labeled LIDAR sensor data). If not, the ICP alignment data may be "untrusted" or otherwise considered bad or less than useful alignment data.

This tolerance value may grow or increase with the uncertainty or covariance for the ICP alignment provided by the ICP algorithm, and vice versa. For example, if the ICP algorithm alignment results in a determined velocity of 36 mph with an error of +/−2 mph, if the velocity determined from the model is 35 mph (which is within 34 to 38 mph), this may be considered a good or trusted ICP alignment. Similarly, if the velocity determined from the model is 39 mph (which is not within 34 to 38 mph), this may be considered a bad ICP alignment.

The model 470 may be trained such that for any given series of two or more LIDAR sensor frames, the model determine how close an ICP alignment would be to a human operator labeled LIDAR sensor data or in other words, whether the ICP alignment should be trusted (good alignment) or should not be trusted (bad alignment). In other words, as shown in block 840 of FIG. 8, the model is trained using the LIDAR sensor data frames such that the model is configured to, in response to receiving additional LIDAR sensor frames and corresponding additional ICP alignment data, output a value indicative of whether the additional ICP alignment data is trusted according to the definition. The more bounding boxes and labels used to train the model, the more accurate the model parameter values 472 may become. At the same time, the more frames, bounding boxes, and labels used to train the model 470, the greater the precision in the models predictions. Or rather, more training may correspond to greater precision in determining whether or not an ICP alignment should be trusted.

The model may then be provided to one or more vehicles in order to allow the computing devices of those vehicles to make better informed driving decisions. For instance, the model 470 and model parameter values 474 may be sent to the computing devices 110 of vehicle 100, for instance via network 460, or by otherwise loading this information into the computing devices 110. This information may then be stored in the memory 130 of the computing devices 110 in order to allow the computing devices to use the model 470 to make driving decisions for the vehicle 100.

Figure 9:
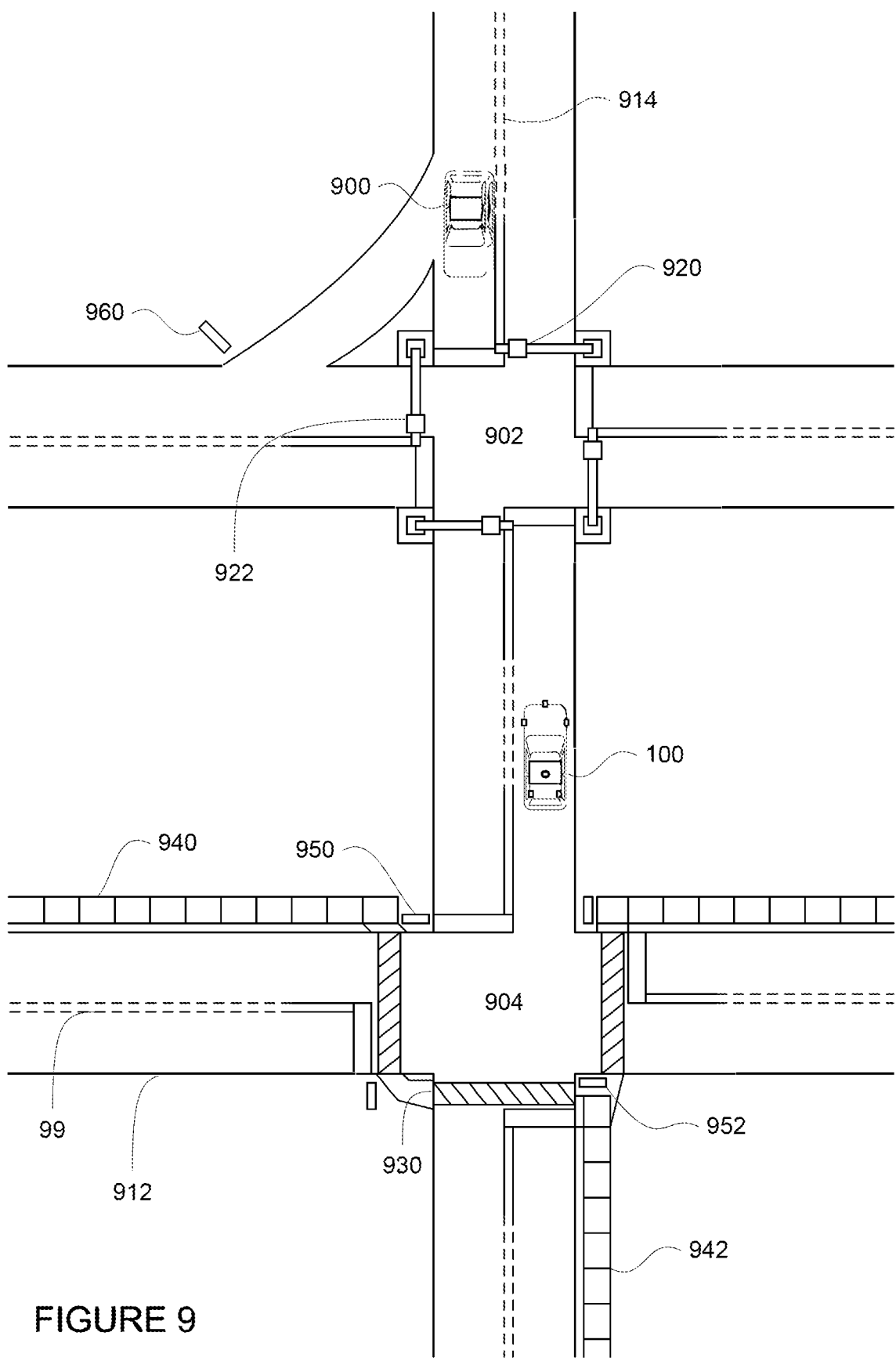
FIG. 9 is an example top down view of a geographic area in accordance with an aspect of the disclosure.
Figure 10:
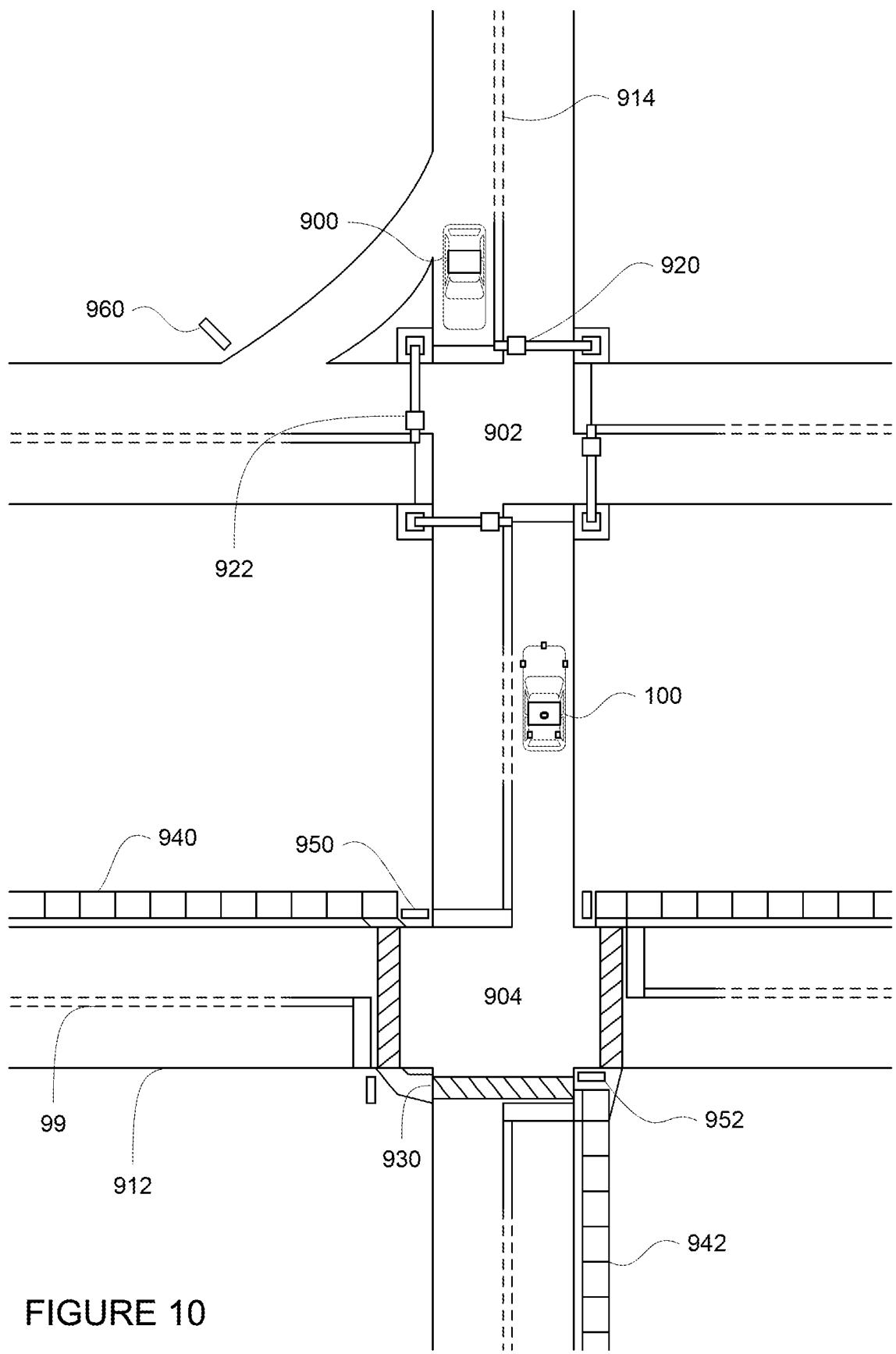
FIG. 10 is an example top down view of a geographic area in accordance with an aspect of the disclosure.

For demonstration purposes, FIGS. 9 and 10 depicts vehicle 100 being maneuvered on a section of roadway 900 including intersections 902 and 904 at different, but consecutive points in time. In example 900 of FIG. 9, vehicle 100 and vehicle 900 are each approaching an intersection 902. In this example, intersections 902 and 904 correspond to the locations of intersections 202 and 204 of the map information 200, respectively. Similarly, lane lines 910, 912, and 914 correspond to the shape, location, and other characteristics of lane lines 210, 212, and 214, respectively. Similarly, crosswalk 930 corresponds to the shape, location, and other characteristics of crosswalk 230, respectively; sidewalks 940 correspond to sidewalks 240; traffic lights 920, 922 correspond to traffic lights 220, 222, respectively; stop signs 950, 952 correspond to stop signs 250, 252, respectively; and yield sign 960 corresponds to yield sign 260.

Figure 11:
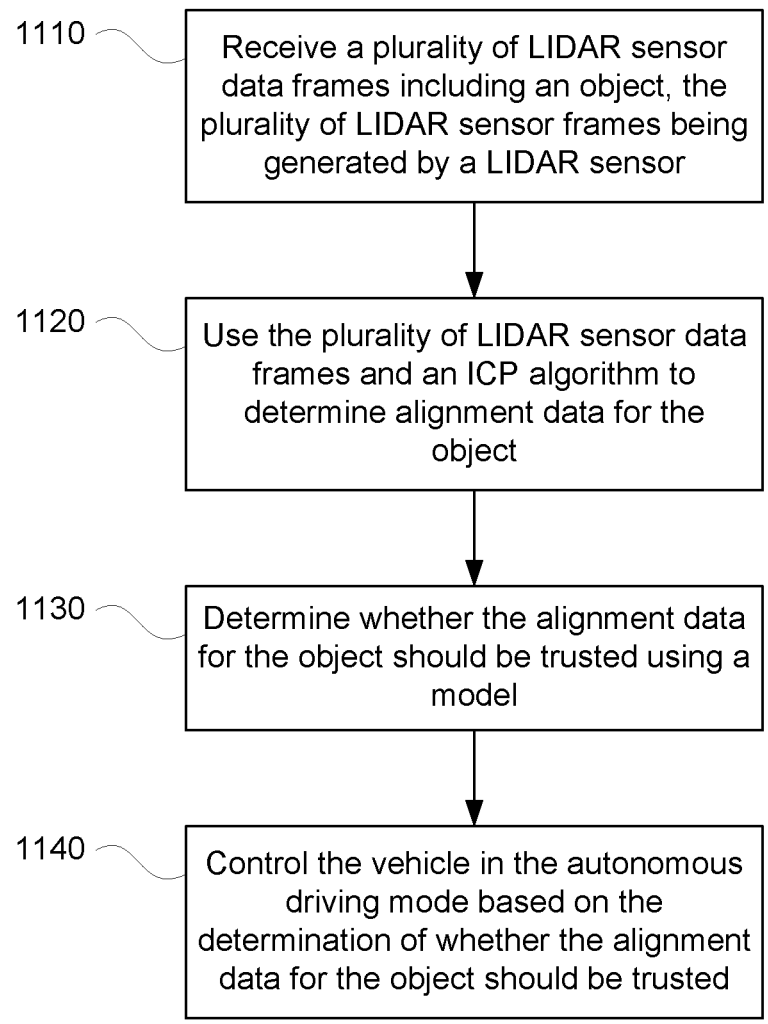
FIG. 11 is an example flow diagram in accordance with aspects of the disclosure.

FIG. 11 is an example flow diagram 1100 in accordance with aspects of the disclosure which may be performed by one or more processors of one or more computing devices, such as processors 120 of computing devices 110, in order to control a vehicle in an autonomous driving mode while also verifying accuracy of ICP alignments. Turning to block 1110, a plurality of LIDAR sensor data frames including an object may be received. The plurality of LIDAR sensor frames may be generated by a LIDAR sensor. For instance, as vehicle 100 drives around, perception system 172 captures sensor data of the vehicle's environment. For example, LIDAR sensor frames including LIDAR sensor data may be collected by a LIDAR sensor of the vehicle, such as the LIDAR sensor of dome housing 312.

Returning to the example of FIGS. 9 and 10, vehicles 100 and 900 is shown in FIG. 9 approaching intersection 902, and vehicles 100 and 900 are shown in FIG. 10 at different locations from FIG. 9 as each vehicle has moved closer to intersection 902. In this regard, FIGS. 9 and 10 may represent two different points in time, progressing forward in time from FIG. 9 to FIG. 10. As noted above, sensor data for each of these points in time may be captured by the sensors of the perception system 172, including a LIDAR sensor of dome housing 312. For the sake of simplicity and clarity, these figures may represent "adjacent" time sequenced LIDAR sensor frames that is the LIDAR sensor frame for FIG. 9 would be captured immediately before the LIDAR sensor frame for FIG. 10. Of course, in reality, it is likely that many additional LIDAR sensor frames would be captured between these two points in time.

Returning to FIG. 11, at block 1120, the plurality of LIDAR sensor data frames are input into an ICP algorithm to determine alignment data for the object. For instance, the LIDAR sensor frames captured at the point in time for FIG. 9 and the point in time for FIG. 10 are input into the ICP algorithm. A translation and rotation between locations of LIDAR sensor points corresponding to vehicle 900 in FIG. 9 and vehicle 900 in FIG. 10 as well as covariance for this alignment may then be determined using the ICP algorithm. In this regard, the ICP algorithm provides ICP alignment data for the vehicle 900 between different, and time sequenced, LIDAR sensor frames.

The model may then be used by the computing devices 110 in order to verify the accuracy of the ICP alignment data. In other words, as shown in block 1130 the model may then be used to determine whether the alignment data for the object should be trusted. For instance, the LIDAR sensor frames corresponding to FIGS. 10 and 11 as well as the ICP alignment data and any available variables and features of the ICP algorithm may be input into the model 470. Again, the variables and features may include the number of iterations, number of point correspondences, correspondence-wise errors and averages, etc. as well as information such as the appearance of the two point clouds aligned by the ICP transform (for instance their overlapping volumes), whether the object was occluded by another object, etc.

The model 470 may then output a determination of whether or not the ICP alignment is trusted or untrusted. For instance, the model may provide a value indicative of how close the alignment data is to a human operator labeled LIDAR sensor data. As noted above, the ICP alignment may be determined to be "trusted" by the model when velocity, translation rate, and/or rotation rate determined from an ICP alignment is within a preset or fixed tolerance value of the ground truth velocity, translation rate, and/or rotation rate which would be expected from the LIDAR sensor frames. If this is not the case, the ICP alignment may be determined to be "untrusted" by the model. Again, rather than using a fixed tolerance value, the tolerance value may grow or increase with the uncertainty or covariance for the ICP alignment provided by the ICP algorithm, and vice versa. In addition or alternatively, as noted above, the model 470 may be configured to output this determination as a binary decision. As an example, 1 may represent trusted and 0 may represent untrusted ICP alignment data; of course, the reverse may also be utilized.

The vehicle may then be controlled in an autonomous driving mode based on the determination of whether the alignment data for the object should be trusted as shown in block 1140. For instance, if the alignment data should be trusted, the vehicle's computing devices may continue to use the ICP alignment data to control the vehicle, for instance by determining velocity and other data for the object, inputting this data into behavior models, determining trajectories for responding to the object, etc.

For any alignments considered untrusted, the vehicle's computing devices may take any number of different actions with respect to the vehicle. For instance, the vehicle's computing devices may simply disregard or ignore the data for the object from the ICP algorithm. As such, untrusted ICP alignment data for the object would not be passed to other downstream systems of the vehicle, such as behavior modeling, trajectory planning, etc. As another instance, the computing devices may increase the uncertainty for the untrusted ICP alignment and other determined characteristics for the object when this information is input into other downstream systems of the vehicle, such as behavior modeling, trajectory planning, etc. For example, this increased uncertainty may be used to predict a future trajectory for the object, for instance, using a behavior model, and/or this increased uncertainty may be used to plan a future trajectory for the vehicle.

These other systems may also be turned to respond differently based on the increased uncertainty or a flag indicating that the ICP alignment was bad. For instance, the flag may be used to plan a future trajectory for the vehicle in order to react to the object. For example, the computing devices may not cause the vehicle to react to the object as strongly if the computing devices are not certain that the object is moving, accelerating, etc. As another instance, the flag may be used to predict a future trajectory for the object. For example, the trajectory of an object may be determined based on the object's velocity, thus, the computing devices may rely on a different way of determining the object's velocity, for instance by using a different sensor such as a radar unit, other than the LIDAR sensor data and ICP alignment data.

The features described herein may allow an autonomous vehicle's computing devices to determine in real time when ICP algorithm alignments between point clouds are not accurate enough to be relied upon to make driving decisions for the autonomous vehicle. In other words, while the ICP algorithm is considered very precise, in some instances, the ICP algorithm can be inaccurate and essentially fail to properly align point clouds. The aforementioned model may thus allow for the determination of when the ICP algorithm has failed which allows an autonomous vehicle's computing devices to react accordingly.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling a vehicle having an autonomous driving mode, the method comprising:
   receiving, by one or more computing devices of the vehicle, a plurality of LIDAR sensor data frames including an object;
   using, by the one or more computing devices, the plurality of LIDAR sensor data frames and an iterative closest point (ICP) algorithm to determine alignment data for the object;
   determining, by the one or more computing devices, whether the alignment data for the object should be trusted using a model, the model configured to take features of the ICP algorithm as input for the determination, wherein the alignment data is trusted when a velocity determined from the alignment data is within a tolerance value of a ground truth velocity expected from the plurality of LIDAR sensor data frames; and controlling, by the one or more computing devices, the vehicle to maneuver in the autonomous driving mode based on the determination of whether the alignment data for the object should be trusted.

2. The method of claim 1, wherein the model is a decision tree.

3. The method of claim 1, wherein the alignment data is trusted when a translation rate determined from the alignment data is within a tolerance value of a ground truth translation rate expected from the plurality of LIDAR sensor data frames.

4. The method of claim 1, wherein the alignment data is trusted when a rotation rate determined from the alignment data is within a tolerance value of a ground truth rotation rate expected from the plurality of LIDAR sensor data frames.

5. The method of claim 1, wherein the model is configured to output a Boolean value indicating whether the alignment data for the object should be trusted.

6. The method of claim 1, wherein the model is configured to output a value indicative of how close the alignment data is to a human operator labeled LIDAR sensor data.

7. The method of claim 1, wherein the alignment data includes covariance, and the model is configured such that the tolerance value increases with the covariance.

8. The method of claim 1, wherein the tolerance value is a fixed value.

9. The method of claim 1, wherein controlling the vehicle based on the determination of whether the alignment data for the object should be trusted further includes disregarding the alignment data.

10. The method of claim 9, further comprising, based on the determination of whether the alignment data for the object should be trusted, using sensor data from a second sensor different from the LIDAR sensor to determine a velocity of the object, and wherein controlling the vehicle is further based on the determined velocity.

11. The method of claim 1, further comprising, based on the determination of whether the alignment data for the object should be trusted, increasing uncertainty for the alignment data, and wherein controlling the vehicle is further based on the increased uncertainty.

12. The method of claim 11, wherein controlling the vehicle further includes using the increased uncertainty to predict a future trajectory for the object.

13. The method of claim 11, wherein controlling the vehicle further includes using the increased uncertainty to plan a future trajectory for the vehicle.

14. The method of claim 1, further comprising, based on the determination whether the alignment data for the object should be trusted, flagging the alignment data as inaccurate, and wherein controlling the vehicle is further based on the flag.

15. The method of claim 14, wherein controlling the vehicle further includes using the flagged alignment data to predict a future trajectory for the object.

16. The method of claim 14, wherein controlling the vehicle further includes using the flagged alignment data to plan a future trajectory for the vehicle.

17. A system for controlling a vehicle having an autonomous driving mode, the system comprising:

a computing device including one or more processors configured to:

receive a plurality of LIDAR sensor data frames including an object;

use the plurality of LIDAR sensor data frames and an iterative closest point (ICP) algorithm to determine alignment data for the object;

determine whether the alignment data for the object should be trusted using a model, the model configured to take features of the ICP algorithm as input for the determination, wherein the alignment data is trusted when a velocity determined from the alignment data is within a tolerance value of a ground truth velocity expected from the plurality of LIDAR sensor data frames; and control the vehicle to maneuver in the autonomous driving mode based on the determination of whether the alignment data for the object should be trusted.

18. The system of claim 17, wherein the alignment data is trusted when a translation rate determined from the alignment data is within a tolerance value of a ground truth translation rate expected from the plurality of LIDAR sensor data frames.

19. The system of claim 17, wherein the alignment data is trusted when a rotation rate determined from the alignment data is within a tolerance value of a ground truth rotation rate expected from the plurality of LIDAR sensor data frames.

20. The system of claim 17, wherein the alignment data includes covariance, and the model is configured such that the tolerance value increases with the covariance.

* * * * *